United States Patent [19]

Grant et al.

[11] Patent Number: 5,211,205
[45] Date of Patent: May 18, 1993

[54] FUEL PRESSURE REGULATOR

[75] Inventors: Barry Grant, Dahlonega; Michael E. Harris, Murrayville, both of Ga.

[73] Assignee: BG 300, Inc., Dahlonega, Ga.

[21] Appl. No.: 916,701

[22] Filed: Jul. 22, 1992

[51] Int. Cl.⁵ .................. F16K 31/12; F16K 31/36
[52] U.S. Cl. ..................... 137/505.41; 137/505.39; 123/457
[58] Field of Search ............ 123/457, 460, 462; 137/505.39, 505.41, 505.42

[56] References Cited

U.S. PATENT DOCUMENTS

| | | | |
|---|---|---|---|
| 1,637,764 | 8/1927 | Coles | 137/505.41 |
| 2,111,560 | 3/1938 | Fox | 137/505.39 |
| 3,075,545 | 1/1963 | Eichelman | 137/505.42 |
| 3,854,496 | 12/1974 | Broszeit | 137/543.19 |
| 4,246,876 | 1/1981 | Bouwkamp et al. | 137/457 |
| 4,491,111 | 1/1985 | Eheim et al. | 123/460 |
| 4,660,597 | 4/1987 | Cowles | 137/505.39 |
| 4,744,387 | 5/1988 | Otteman | 137/505.41 |
| 4,756,288 | 6/1988 | Bonfiglioli et al. | 123/460 |
| 4,887,639 | 12/1989 | Lewis et al. | 137/505.41 |
| 5,141,022 | 8/1992 | Black | 137/505.41 |

FOREIGN PATENT DOCUMENTS

| | | | |
|---|---|---|---|
| 0654825 | 3/1979 | U.S.S.R. | 137/505.39 |
| 6263 | of 1909 | United Kingdom | 137/505.39 |
| 506726 | 3/1939 | United Kingdom | 137/505.39 |

Primary Examiner—E. Rollins Cross
Assistant Examiner—Thomas Moulis
Attorney, Agent, or Firm—Hopkins & Thomas

[57] ABSTRACT

A fuel pressure regulator including a high pressure fuel supply chamber (18), a low pressure diaphragm chamber (19), a valve mechanism (21-24) for controlling the flow of fuel between the high and low pressure chambers, and a resilient impervious diaphragm (31) within the low pressure diaphragm chamber and coupled to the valve mechanism for imparting pressure fluctuations in the low pressure diaphragm chamber to the valve element of the valve mechanism. The fuel pressure regulator includes an array of alternating valve guide surfaces (58) and fuel flow channels (59) disposed about the valve element (23,24) for restraining the reciprocating movement of the valve element to and from a valve seat. The fuel flow channels provide a fuel flow design that uniformly delivers fuel through the valve mechanism into the low pressure diaphragm chamber.

15 Claims, 3 Drawing Sheets

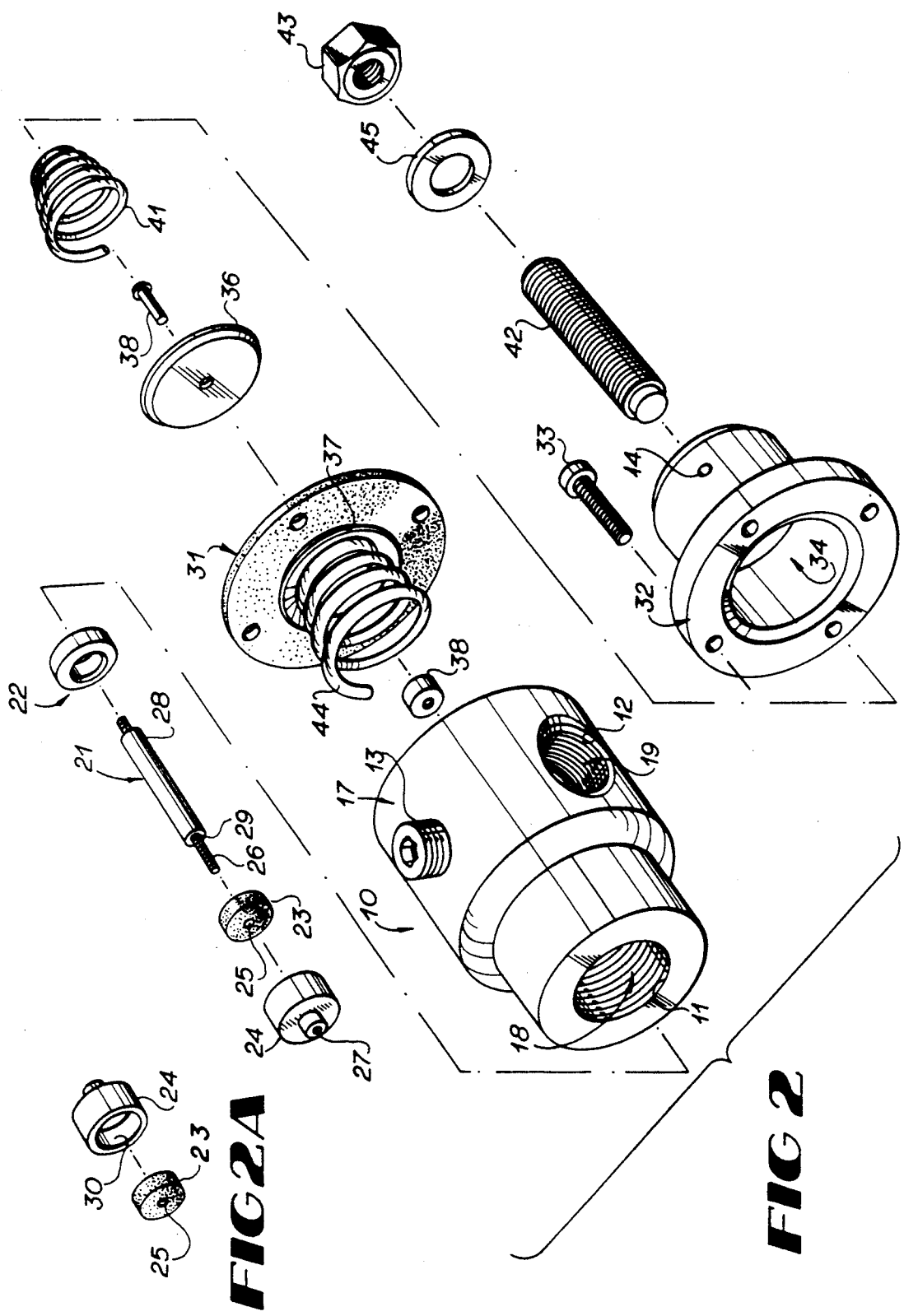

FUEL PRESSURE REGULATOR

FIELD OF THE INVENTION

This invention relates generally to fuel pressure regulators and, more particularly, to throttling type of pressure regulators employable as with fuel metering systems for metering fuel flow to an associated internal combustion engine.

BACKGROUND OF THE INVENTION

In some fuel supply systems for internal combustion engines of, for example, automobiles, fuel is delivered from a fuel tank by a fuel pump at an unregulated pressure to a pressure regulating device, such as a fuel pressure regulator. The fuel pressure regulator delivers fuel at a predetermined pressure to a fuel metering device that, in turn, supplies metered fuel to a fuel delivery means, such as a carburetor or a fuel injection system. The fuel delivery means, in turn, delivers an appropriate air-fuel mixture to the associated engine.

Whether a carburetor or a fuel injection system is employed to deliver fuel to the engine, the fuel delivery means is highly sensitive to any pressure fluctuations in the fuel supply system. An improper fuel pressure or a fluctuating fuel pressure can adversely affect the engine's ability to burn fuel cleanly and operate efficiently to achieve maximum performance. Therefore, it is highly desirable to maintain a steady fuel pressure at the fuel delivery means, particularly for high performance engines.

It is known in the art to regulate the fuel pressure in the fuel supply system with fuel pressure regulators of the diaphragm-and-spring type. Such regulators typically have a fuel inlet chamber for receiving high pressure fuel from the fuel pump, a diaphragm chamber that has a fuel outlet for delivering fuel at a regulated pressure to the fuel metering means, a resilient, impervious diaphragm assembly closing off the diaphragm chamber that is sensitive to pressure fluctuations in the diaphragm chamber, a valve mechanism for controlling fuel communication between the fuel inlet chamber and the diaphragm chamber, and an adjustable spring that biases the diaphragm assembly into the diaphragm chamber and the valve mechanism toward an open position.

The valve mechanism typically comprises a valve seat disposed about a passageway between the fuel inlet chamber and the diaphragm chamber and a valve closure element for closing off the passageway. The valve closure element is connected to and actuated by a valve stem, which extends therefrom and engages at its other end with the diaphragm assembly. So arranged, movement of the diaphragm is imparted to the valve closure element through the valve stem, thereby throttling the flow of fuel through the passageway in response to pressure fluctuations in the diaphragm chamber.

With such diaphragm-and-spring type regulators, it is desirable for the fuel to flow uniformly through the valve passageway so that the flow of fuel does not impart any lateral forces on the valve closure element, causing the valve closure element to misalign itself with respect to the valve seat. Maintaining of the valve closure element in alignment with the valve seat also reduces and more uniformly distributes the wear along the cooperating elements of the valve mechanism, thus improving the overall performance of the regulator.

In order to maintain the valve closure element in alignment with the valve seat, valve guide means typically are provided either at some point along the valve stem or at the valve closure element itself. The valve guide means restrains valve misalignment caused by fuel pressure and vibrations acting against the valve closure element, and by any flexing or sideways movements of the resilient diaphragm imparted to the valve closure element through the valve stem. However, provision of the guide means along the valve stem requires a complicated manufacturing process, while provision of the guide means at the valve closure element itself typically has involved a complicated fuel inlet chamber design to insure that the guide means does not interfere with the flow of fuel through the valve seat. Such complicated designs undesirably add to the cost of the regulator.

In typical fuel pressure regulators, a second biasing means is employed to counterbalance the biasing force of the adjustable spring. This second biasing means typically is a spring positioned adjacent the valve within the fuel flow path. The spring biases the valve closure element against the valve seat. However, positioning of this second spring within the fuel inlet chamber and within the flow of fuel past the valve closure element can have undesirable effects on the performance of the regulator. Preferably, the spring should be located out of the fuel flow path so that it does not restrict the flow of fuel.

Accordingly, a heretofore unaddressed need exists for a fuel pressure regulator having a valve guide means that is simple in design and inexpensive to manufacture, yet which operates accurately to control fuel pressure, and which also has a counterbalancing spring biasing means that does not restrict the flow of fuel through the regulator. It is to the provision of such a fuel pressure regulator that the present invention is primarily directed.

SUMMARY OF THE INVENTION

Briefly described, the present invention comprises a fuel pressure regulator for regulating the pressure of fuel flowing through a fuel supply system from a fuel tank to an internal combustion engine. The fuel pressure regulator comprises a housing that defines a high pressure fuel inlet or supply chamber and a low pressure diaphragm chamber. The high pressure fuel supply chamber has a fuel inlet port for communicating with the fuel pump, and the low pressure diaphragm chamber has exit ports for communicating with the fuel metering means. An internal passageway connects the fuel supply chamber with the diaphragm chamber and a valve mechanism throttles the flow of fuel through the passageway.

The low pressure diaphragm chamber has a resilient, impervious diaphragm forming a wall thereof that is exposed at its exterior side to atmosphere about the fuel pressure regulator as by a vented cap closing off the resilient diaphragm. An adjustable coil spring is mounted within the vented cap and is selectively loaded against the resilient diaphragm to bias it toward the diaphragm chamber.

The resilient diaphragm has mounted to its interior side a valve stem that extends therefrom through the low pressure diaphragm chamber into the high pressure fuel supply chamber through the passageway therebetween. The valve arrangement is provided at the end of the valve stem within the high pressure fuel supply chamber, and includes a valve seat disposed about the passageway, an elastomeric valve closure element or valve disk mounted onto the valve stem, and a rigid valve holding member enclosing the top and the sides of the elastomeric valve for securably mounting the elastomeric valve disk to the valve stem.

The valve disk is maintained in alignment with the valve seat by an array of alternating valve guide surfaces and fuel flow channels surrounding the valve holding member within the high pressure fuel supply chamber. The valve guide surfaces are juxtaposed the valve holding element and guide its movement and, consequently, the movement of the elastomeric valve disk toward and away from the valve seat. The fuel flow channels are shaped for guiding the fuel from the high pressure fuel supply chamber about the valve holding member and through the valve seat when the elastomeric valve disk is displaced therefrom.

The high pressure fuel supply chamber is formed by a large bore extending from the inlet port of the fuel supply chamber into the interior of the housing defining the fuel supply chamber. A smaller stepped bore is formed at the interior end of the large bore and extends further into the housing up to the valve seat. The intersection of the walls of the small bore with the walls of the large bore forms a step or a shoulder portion. The fuel flow channels are formed within this stepped shoulder portion and extend along a portion of the small bore walls toward the valve seat. The walls of the small bore between the fuel flow channels comprise the valve guide surfaces that align the valve holding member. Consequently, the valve guide means can be fabricated with a few simple machining operations: one machining step for the large bore, one for the small bore, and one for the fuel flow passages.

The low pressure diaphragm chamber includes a counterbore therein adjacent the resilient diaphragm. The counterbore receives a spring biasing means for centering the resilient diaphragm so that the diaphragm can impart accurately pressure changes in the diaphragm chamber to the valve disk, thereby positioning the valve disk in the desired location to control the flow of fuel through the valve. When the fuel pump is activated but the engine is not receiving fuel, the high pressure of the fuel adjacent the diaphragm urges the diaphragm away from the low pressure diaphragm chamber, thereby causing the valve stem to move the elastomeric valve disk into seating engagement with the valve seat. This prevents further flow of fuel through the fuel pressure regulator. When the engine begins to receive fuel, the pressure at the diaphragm decreases and the diaphragm moves to open the valve. The positioning of the spring biasing means within the counterbore in the diaphragm chamber places the spring out of the path of the flow of fuel, thereby reducing a fuel flow restriction found in the prior art.

The valve holding member is a circular bowl-shaped structure forming a recessed portion sized to receive the valve closure element. The valve holding member encloses the elastomeric valve closure element on all but the side of the valve closure element exposed to the valve seat. The sides of the bowl-shaped valve holding member provide a solid surface for guiding the elastomeric valve as well as a means for restraining deformation of the elastomeric valve as it engages the valve seat.

The valve stem is mounted securably at one end to the resilient diaphragm, and the elastomeric valve is securably mounted to the valve stem at its other end by the valve holding member. This arrangement provides for direct response of the elastomeric valve to movements of the resilient diaphragm. In addition, the valve stem is provided with an enlarged central portion forming a shoulder at one end thereof. This shoulder portion provides an accurate mounting point at which the elastomeric valve can be secured to the valve stem. Thus, with the elastomeric valve mounted on the valve stem at this shoulder portion, a desired distance between the elastomeric valve and the resilient diaphragm can be accurately achieved, providing a precise initial setting for the elastomeric valve and an increase in the sensitivity of the regulator.

Accordingly, it is an object of the present invention to provide a fuel pressure regulator having a valve guide means that is simple in design and inexpensive to manufacture.

Another object of the present invention is to provide a fuel pressure regulator that includes a counterbalancing spring biasing means that is located out of the path of the flow of fuel through the regulator for closing the valve disk.

Another object of the present invention is to provide a fuel pressure regulator having an array of alternating valve guide surfaces and fuel flow channels about the valve disk for maintaining the valve disk in alignment with the valve seat of the fuel pressure regulator.

Another object of the present invention is to provide a fuel pressure regulator having a valve disk mounted to a resilient impervious diaphragm so that movement of the diaphragm is imparted directly to the valve disk thereby improving the sensitivity of the regulator to pressure fluctuations.

Another object of the present invention is to provide a fuel pressure regulator that is efficient in operation and durable in structure.

Another object of the present invention is to provide a fuel pressure regulator with an elastomeric valve, yet with a means for accurately guiding the valve as well as a means for restraining deformation of the valve upon engagement of the valve with the valve seat.

Another object of the present invention is to provide a fuel pressure regulator having a means for accurately mounting the elastomeric disk a predetermined distance from the resilient diaphragm.

Other objects, features, and advantages of the present invention will become apparent from the following specification, when read in conjunction with the accompanying drawings.

BRIEF DESCRIPTION OF THE DRAWINGS

FIG. 2 is an exploded view the fuel pressure regulator shown in FIG. 1.

DETAILED DESCRIPTION

Figure 1:
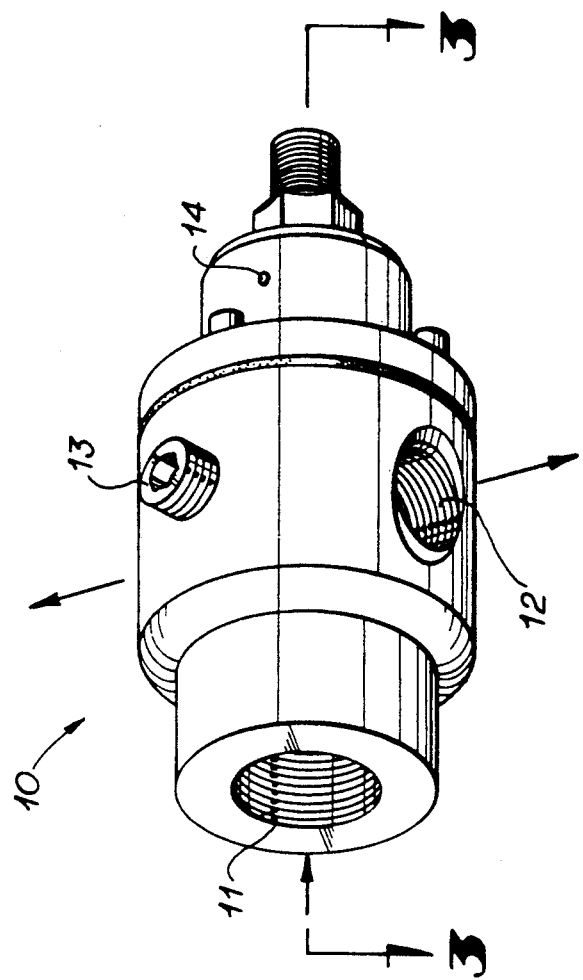
FIG. 1 is a perspective view of a preferred embodiment of the fuel pressure regulator of the present invention.

Referring now in more detail to the drawings, in which like numerals represent like parts throughout the several views, FIG. 1 is a perspective view of a preferred embodiment of the fuel pressure regulator 10 of the present invention. The fuel pressure regulator 10 includes a high pressure fuel inlet port 11, two low pressure fuel outlet ports 12 (only one shown), a pressure port 13, and an atmospheric vent 14. The high pressure fuel inlet port 11 receives fuel supplied from a fuel pump located within a fuel supply system between the fuel pressure regulator 10 and a fuel tank. The low pressure outlet ports 12 deliver pressure regulated fuel to a fuel metering means located in the fuel supply system between the fuel pressure regulator 10 and a fuel delivery means. The pressure port 13 is provided for connecting a pressure gauge to the low pressure chamber within the fuel pressure regulator.

FIG. 2 is an exploded view of the fuel pressure regulator 10 shown in FIG. 1. The fuel pressure regulator 10 comprises an elongated circular housing 17 defining the high pressure fuel inlet port 11 and the low pressure fuel outlet port 12. Within the housing 17 are defined a high pressure fuel supply chamber 18 and a low pressure diaphragm chamber 19. Mounted within the high pressure fuel supply chamber 18 are the valve mechanism elements comprising an elongated valve stem 21, an annular valve seat 22, an elastomeric valve disk 23, and a valve disk holder 24. The central opening 25 of the elastomeric valve disk 23 mounts about a threaded end 26 of the valve stem 21, the diameter of the threaded end 26 being less than the diameter of the central opening 25 of the valve stem 21. Valve disk holder 24 has a threaded bore 27 therethrough that allows the valve disk holder 24 to thread onto end 26 of valve stem 21.

The valve stem 21 has a central portion 28 with a larger diameter than the diameter of the threaded end 26. The junction of the central portion 28 and the threaded end 26 forms a shoulder 29. The elastomeric valve disk 26 mounts onto the threaded end 26 up to the shoulder 29. The shoulder 29 provides a precise mounting location point for the elastomeric valve 23, allowing it to be mounted at a predetermined distance from the other end of the valve stem 21.

As shown in FIG. 2A, the valve disk holder 24 is bowl-shaped with a recessed portion 30 for receiving the elastomeric valve disk 23. The valve disk 23 fits snugly within the recessed portion 30 and, thus, is enclosed on all of its sides except the side exposed to the valve seat 22. So arranged, the elastomeric valve disk 23 can be securely mounted onto the valve stem 21.

A resilient impervious diaphragm 31 closes off the low pressure diaphragm chamber 19 and is secured to housing 17 by a cap piece 32, as by bolts 33, (only one shown). Cap 32 defines an atmospheric chamber 34 on one side of the resilient impervious diaphragm 31. The atmospheric chamber 34 communicates with the atmosphere about the fuel pressure regulator via vent 14. The resilient impervious diaphragm is securely sandwiched between two spring bearing plates 36 and 37, as by rivet 38. Spring bearing plate 36 provides a surface upon which can bear a spring means 41, which biases the resilient impervious diaphragm toward the low pressure diaphragm chamber 19 within housing 17. Spring means 41 is threadably secured to a spring adjustment bolt 42, which is threadably secured within the top of cap 32 and held thereon by a nut 43 and a washer 45. An adjustment of adjustment bolt 42 allows the spring means 41 to be adjusted relative to the resilient impervious diaphragm in order to adjust the spring pressure bearing against bearing plate 36.

Spring bearing plate 37 provides a bearing surface upon which can bear spring means 44. Spring means 44 is held within the low pressure diaphragm chamber 12, as explained hereinafter, and bears against bearing plate 37, thereby biasing the resilient impervious diaphragm 31 away from the low pressure diaphragm chamber 12.

Figure 3:
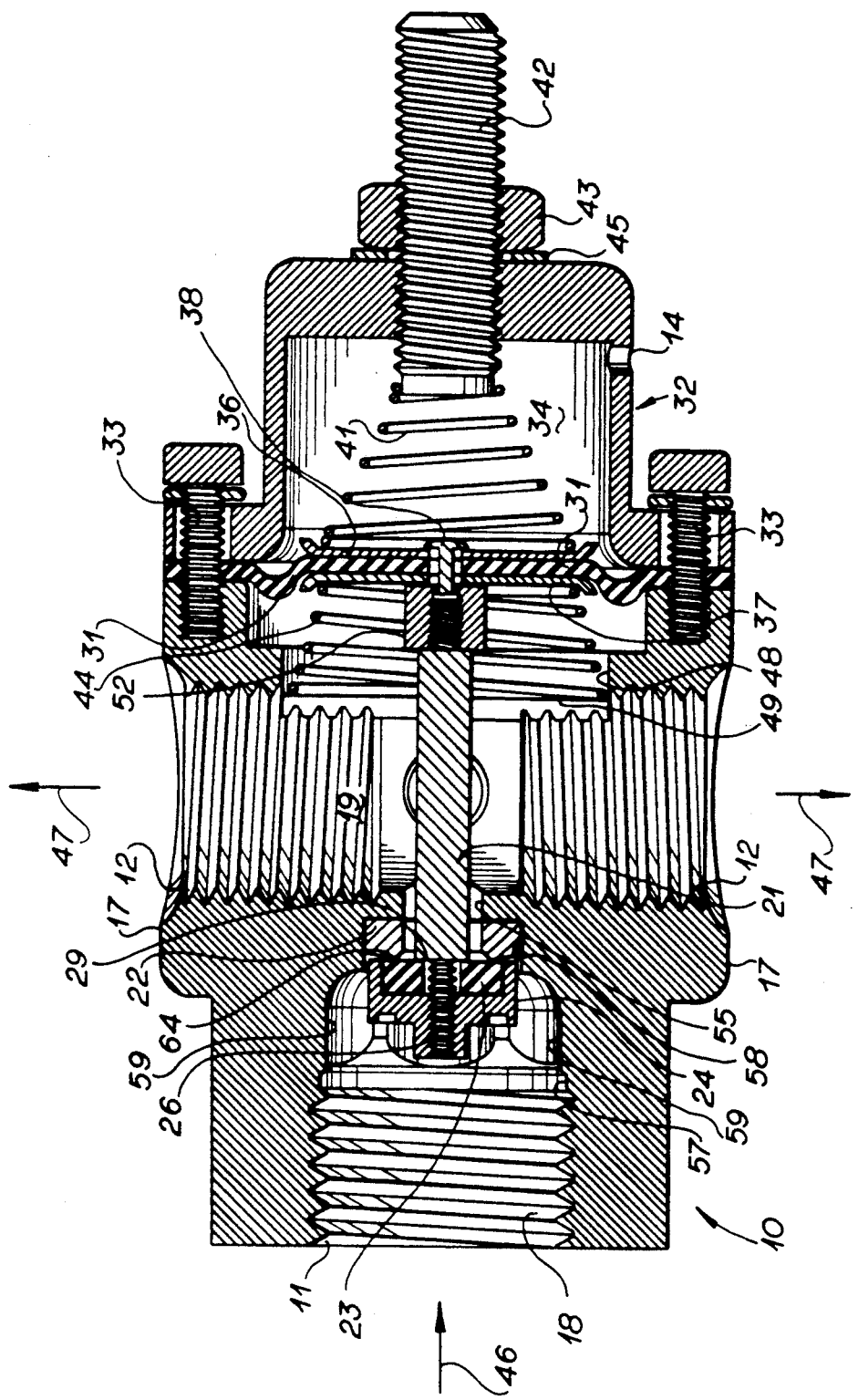
FIG. 3 is a sectional view taken along the lines 3—3 of FIG. 1.

FIG. 3 is a sectional view taken along the lines 3—3 of FIG. 1 illustrating the internal components of the fully assembled fuel pressure regulator 10. Arrow 46 indicates the direction of the flow of fuel through inlet port 11 and into the high pressure fuel supply chamber 18, and arrows 47 indicate the flow of fuel through the outlet ports 12 from the low pressure diaphragm chamber 19. The resilient impervious diaphragm 31 is shown sandwiched between spring bearing plates 36 and 37 and biased by spring means 41 and 44.

Spring means 44 is releasibly loaded within counter bore 48 formed within the housing 17 and engages at one of its ends the bottom surfaces 49 formed by counter bore 48 and engages at its other end the spring bearing plate 37. Spring biasing means 41 is shown in engagement at one end with spring bearing plate 36 and at its other end threadably secured to adjustment bolt 42, which is threadably secured to cap 32 and held by nut 43 and washer 45. Bolts 33 secure cap 32 and the resilient impervious diaphragm 31 to housing 17. Vent 14 allows atmospheric chamber 34 to communicate with the atmosphere about the fuel pressure regulator 10.

The valve stem 21 is threadably secured to a nut 52 mounted to spring bearing plate 37. The valve stem 21 extends up into the high pressure fuel supply chamber through a passageway 55, which connects the low pressure diaphragm chamber 19 with the high pressure fuel supply chamber 18. The high pressure fuel supply chamber 18 is formed by a large bore 57 and a smaller stepped bore 58 adjacent the fuel flow passageway 55. An array of fuel flow channels 59 are machined within the walls forming the small bore 58 within the high pressure fuel supply chamber, and are discussed in more detail with reference to FIG. 4.

The elastomeric valve disk 23 is inserted onto the threaded end 26 of the valve stem 21 up to shoulder 29 and is securable held thereon by the valve disk holder 24, which is threadably secured onto the threaded end 26 of the valve stem 21. The valve seat 22 is pressfit into the small bore 58 up to passageway 55. The valve seat 22 has a pointed rim 64 that engages the elastomeric valve disk 23 and thereby provides a tight seal therebetween. The mounting of the elastomeric valve disk 23 to the valve stem 21 by means of valve disk holder 24 and the mounting of the valve stem 21 to the spring bearing plate 36, provide a direct response of the elastomeric valve 23 to pressure fluctuations and vibrations acting against the resilient diaphragm 31. In addition, the direct coupling of the elastomeric disk 23 to the spring bearing plate 36, in combination with the mounting of the elastomeric disk 23 at the shoulder 29 of the valve stem 21 provides a precise location point for the elastomeric valve disk 23 with respect to the valve seat 22. This improves the response of the regulator to pressure fluctuations.

Figure 4:
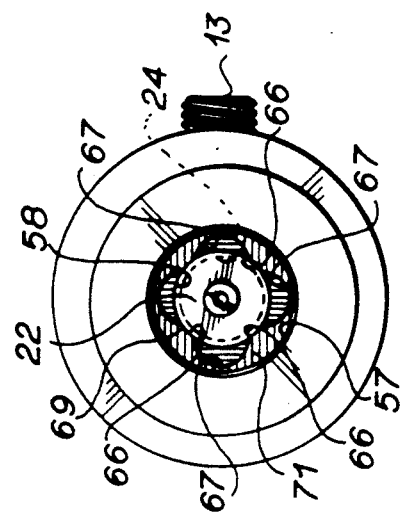
FIG. 4 is an end view of the high pressure fuel supply chamber of the fuel pressure regulator of FIG. 1 shown with the valve stem, the valve disk, and the valve holding element removed to illustrate the array of alternating valve guide surfaces and the fuel flow channels.

FIG. 4 is an end view of the high pressure fuel supply chamber 18 with the valve disk holder, valve disk, and valve stem removed illustrating the array of alternating valve guide surfaces 66 and fuel flow channels 67. The valve disk holder 24 is shown in dashed lines within the contours of the valve guide surfaces 66. The valve seat 22 is pressfit within the small bore 58, and the walls 69 that form the small bore 58 comprise the valve guide surfaces 66. The juxtaposition of the large bore 57 and the small stepped bore 58 forms a shoulder portion 71 in which the fuel flow channels 67 are machined, or otherwise formed. The diameter of the small bore 58 is slightly greater than the diameter of the valve disk holder 24, thereby allowing the valve disk holder 24 to move toward and away from the valve seat 22 guided within the small bore 58. The sides of the valve disk holder 24 provide a solid surface surrounding the elastomeric valve disk for accurately guiding the valve disk.

In operation, the fuel flows through the large bore 57 uniformly into the fuel flow channels 67, around and underneath the valve disk holder 24 and the valve disk (not shown), and through the valve seat 22 into the low pressure diaphragm chamber. Any increase in the pressure of the fuel delivered from the low pressure chamber 19 will cause the pressure in the low pressure diaphragm chamber to increase and thereby cause the diaphragm to flex to the right, as shown in FIG. 3, into the atmospheric chamber 34. This will cause the valve disk 23 to move toward the valve seat 22, thereby closing off the passageway 55 and limiting the flow of fuel through the fuel pressure regulator 10. A decrease in pressure of the low pressure fuel delivered from the diaphragm chamber will have an opposite effect.

Consequently, it is important for fluctuations in fuel pressure within the low pressure diaphragm chamber to be imparted immediately to the resilient, impervious diaphragm and, in turn, the valve disk, in order to increase the sensitivity of the regulator, allowing it to maintain a steady pressure in the fuel supply system. The uniform flow of fuel past the guide means and the position of the spring means 44 out of the flow of fuel function to accomplish this objective.

It should be noted that the fuel pressure regulator described herein, while especially applicable to internal combustion engines, is not limited to such applications, but is obviously adaptable, with or without modification, to a great variety of applications where fuel is intended to be supplied under pressure in other fuel consuming devices. Consequently, while the foregoing description is that of a preferred embodiment of the present invention, it will be apparent to those skilled in the art that numerous changes or modifications may be made thereto without departure from the spirit and scope of the invention as claimed hereinafter.

We claim:

1. In a fuel pressure regulator for regulating the pressure of fuel flowing from a high pressure source to a lower pressure application, the fuel pressure regulator including a housing defining a high pressure fuel supply chamber, a low pressure diaphragm chamber having a resilient impervious diaphragm, and a fuel passageway between the high pressure fuel supply chamber and the low pressure diaphragm chamber, the resilient impervious diaphragm being exposed on one of its sides to the fuel in the low pressure diaphragm chamber and on the other of its sides to atmosphere about the fuel pressure regulator, a valve seat about the fuel passageway, a valve closure element in the high pressure fuel supply chamber movable toward and away from the valve seat, and a valve stem engaging at one of its ends with the valve closure element and engaging at the other of its ends with the resilient impervious diaphragm so that the valve closure element moves in response to the movement of the resilient impervious diaphragm the improvement therein comprising:

the high pressure fuel supply chamber defining an array of alternating valve guide surfaces and fuel flow channels surrounding the valve closure element, said valve guide surfaces being juxtaposed the valve closure element for guiding the movement of the valve closure element toward and away from the valve seat, and said fuel flow channels shaped for guiding fuel from the high pressure fuel supply chamber about the valve closure element through the valve seat when the valve closure element is displaced from said valve seat;

wherein said valve guide surfaces comprise the walls of a small bore within the high pressure fuel supply chamber adjacent the valve seat, said small bore being adjacent a large bore forming the inlet cavity of the high pressure fuel supply chamber, the juxtaposition of the small bore and large bore forming a shoulder portion, and wherein said fuel flow channels are formed within said shoulder portion and extend along a proton of said small bore walls toward the valve seat.

2. The fuel pressure regulator of claim 1, wherein said array of alternating valve guide surfaces and fuel flow channels surround the valve closure element in a symmetrical arrangement for balancing any lateral forces perpendicular to the valve stem acting on the valve closure element and caused by said valve guide surfaces and the flow of fuel through said fuel flow channels.

3. In a fuel pressure regulator of regulating the pressure of fuel flowing from a high pressure source to a lower pressure application, the fuel pressure regulator including a housing defining a high pressure fuel supply chamber, a low pressure diaphragm chamber having a resilient impervious diaphragm, and a fuel passageway between the high pressure fuel supply chamber and the low pressure diaphragm chamber, the resilient impervious diaphragm being exposed on one of its sides to the fuel in the low pressure diaphragm chamber and on the other of its sides to atmosphere about the fuel pressure regulator, a valve seat about the fuel passageway, a valve closure element in the high pressure fuel supply chamber movable toward and away from the valve seat, and a valve stem engaging at one of its ends with the valve closure element and engaging at the other of its ends with the resilient impervious diaphragm so that the valve closure element moves in response to the movement of the resilient impervious diaphragm the improvement therein comprising:

the high pressure fuel supply chamber defining an array of alternating valve guide surfaces and fuel flow channels surrounding the valve closure element, said valve guide surfaces being juxtaposed the valve closure element for guiding the movement of the valve closure element toward and away from the valve seat, and said fuel flow channels shaped for guiding fuel from the high pressure fuel supply chamber about the valve closure element through the valve seat when the valve closure element is displaced from said valve seat, wherein said valve guide surfaces comprise the walls of a of the high pressure fuel supply chamber, and the fuel flow channels are within high pressure fuel supply chamber walls.

4. The fuel pressure regulator of claim 3, and further comprising first biasing means for urging the resilient impervious diaphragm toward the low pressure diaphragm chamber and second biasing means for urging the resilient impervious diaphragm away from said low pressure diaphragm chamber.

5. The fuel pressure regulator of claim 4, wherein the low pressure diaphragm chamber includes a counter-bore and said second biasing means is disposed within said counter-bore.

6. In a fuel pressure regulator for regulating the pressure of fuel flowing from a high pressure source to a lower pressure application, the fuel pressure regulator including a housing defining a high pressure fuel supply chamber, a low pressure diaphragm chamber having a resilient impervious diaphragm, and a fuel passageway between the high pressure fuel supply chamber and the low pressure diaphragm chamber, the resilient impervious diaphragm being exposed on one of its sides to the fuel in the low pressure diaphragm chamber and on the other of its sides to atmosphere about the fuel pressure regulator, a valve seat about the fuel passageway, a valve closure element in the high pressure fuel supply chamber movable toward and away from the valve seat, and a valve stem engaging at one of its ends with the valve closure element and engaging at the other of its ends with the resilient impervious diaphragm so that the valve closure element moves in response to the movement of the resilient impervious diaphragm the improvement therein comprising:

the high pressure fuel supply chamber defining an array of alternating valve guide surfaces and fuel flow channels surrounding the valve closure element, said valve guide surfaces being juxtaposed the valve closure element for guiding the movement of the valve closure element toward and away from the valve seat, and said fuel flow channels shaped for guiding fuel from the high pressure fuel supply chamber about the valve closure element through the valve seat when the valve closure element is displaced from said valve seat;

and further comprising first biasing means for urging the resilient impervious diaphragm toward the low pressure diaphragm chamber and second biasing means for urging the resilient impervious diaphragm away from said low pressure diaphragm chamber, wherein the low pressure diaphragm chamber includes a counter-bore and the second biasing means is disposed within said counter-bore, wherein the flow of fuel through the fuel pressure regulator is along a main path along which a majority of the fuel flows and the counter-bore is displaced from the main path.

7. In a fuel pressure regulator for regulating the pressure of fuel flowing from a high pressure source to a lower pressure application, the fuel pressure regulator including a housing defining a high pressure fuel supply chamber, a low pressure diaphragm chamber having a resilient impervious diaphragm, and a fuel passageway between the high pressure fuel supply chamber and the low pressure diaphragm chamber, the resilient impervious diaphragm being exposed on one of its sides to the fuel in the low pressure diaphragm chamber and on the other of its sided to atmosphere about the fuel pressure regulator, a valve seat about the fuel passageway, a valve closure element in the high pressure fuel supply chamber movable toward and away from the valve seat, and a valve stem engaging at one of its ends with the valve closure element and engaging at the other of its ends with the resilient impervious diaphragm so that the valve closure element moves in response to the movement of the resilient impervious diaphragm the improvement therein comprising:

the high pressure fuel supply chamber defining an array of alternating valve guide surfaces and fuel flow channels surrounding the valve closure element, said valve guide surfaces being juxtaposed the valve closure element for guiding the movement of the valve closure element toward and away from the valve seat, and said fuel flow channels shaped for guiding fuel from the high pressure fuel supply chamber about the valve closure element through the valve seat when the valve closure element is displaced from said valve seat wherein the valve closure element comprise and elastomeric valve disk and a valve disk holder for securing said elastomeric valve disk to the valve stem, said valve disk holder mounted to the valve stem so that said elastomeric valve disk is oriented approximately perpendicular to the valve stem.

8. The fuel pressure regulator of claim 7, wherein the valve stem includes a shoulder portion at one end thereof and said elastomeric valve disk is secured to the valve stem abutting said shoulder portion so that a valve mounting location is provided for securing the elastomeric valve disk to the valve stem at a predetermined point longitudinally along the valve stem.

9. The fuel pressure regulator of claim 7, wherein said valve stem is secured to the resiliently impervious diaphragm at the other of its end remote from said elastomeric valve disk so that said elastomeric valve disk is directly coupled to the resilient impervious diaphragm.

10. A fuel pressure regulator for regulating the flow of fuel from a high pressure source to a low pressure application comprising:

a housing including a high pressure fuel supply chamber and a low pressure diaphragm chamber, a resilient impervious diaphragm means forming a portion of the chamber walls of said low pressure diaphragm chamber, said housing defining a fuel inlet communicating with said high pressure fuel supply chamber, said housing defining a fuel outlet communicating with said low pressure fuel supply chamber, first biasing means for urging said resilient impervious diaphragm means into said low pressure diaphragm chamber, a passageway for directing the flow of fuel between said high pressure fuel supply chamber and said low pressure diaphragm chamber, valve means for controlling the flow of fuel through said passageway, said valve means including a valve seat about said passageway, a valve stem extending through said valve seat and engaging at one of its ends said resilient impervious diaphragm and having its other end extending into said high pressure supply chamber, and a valve closure element mounted to said valve stem at its other end extending into said high pressure fuel supply chamber for closing off said passageway, the high pressure fuel supply chamber defining an array of alternating valve guide surfaces and fuel flow channels surrounding the valve closure element, said valve guide surfaces being juxtaposed the valve closure element for guiding the movement of the valve closure element toward and away from the valve seat, and said fuel flow channels shaped for guiding fuel from the high pressure fuel supply chamber about the valve closure element through the valve seat when the valve closure element is displaced from said valve seat wherein said valve guide surfaces comprise the walls of a small bore adjacent the valve seat and within the high pressure fuel supply chamber, said small bore being adjacent a large bore forming the inlet cavity of the high pressure fuel supply chamber, the juxtaposition of the small bore and large bore forming a shoulder portion, and wherein said fuel flow channels are formed within said shoulder portions and extend along a portion said small bore walls toward the valve seat.

11. The fuel pressure regulator of claim 10, wherein said plurality of channels are disposed symmetrically about the periphery of said valve closure element for balancing the lateral forces perpendicular to said valve stem acting on said valve closure element and causes by said valve guide surfaces and the flow of fuel through the fuel flow channels.

12. A fuel pressure regulator for regulating the flow of fuel from a high pressure source to a low pressure application comprising a housing including a high pressure fuel supply chamber and a low pressure diaphragm chamber, a resilient impervious diaphragm means forming a portion of the chamber walls of said low pressure diaphragm chamber, said housing defining a fuel inlet communicating with said high pressure fuel supply chamber, said housing defining a fuel outlet communicating with said first biasing means for urging said resilient impervious diaphragm means into said low pressure fuel diaphragm chamber, a passageway for directing the flow of fuel between said high pressure fuel supply chamber and said low pressure diaphragm chamber, valve means for controlling the flow of fuel through said passageway, said valve means including a valve seat about said passageway, a valve stem extending through said valve seat and engaging at one of its ends said resilient impervious diaphragm and having its other end extending into said high pressure supply chamber, and a valve closure element mounted to said valve stem at its other end extending into said high pressure fuel supply chamber for closing off said passageway, the high pressure fuel supply chamber defining an array of alternating valve guide surfaces and fuel flow channels surrounding the valve closure element, said valve guide surfaces being juxtaposed the valve closure element for guiding the movement of the valve closure element toward and away from the valve seat, and said fuel flow channels shaped for guiding fuel from the high pressure fuel supply chamber about the valve closure element through the valve seat when the valve closure element is displaced from said valve seat wherein said valve closure element comprises a resilient elastomeric valve disk and a valve disk holder for receiving said resilient elastomeric valve disk and securing it to said valve stem with said resilient elastomeric valve disk oriented at approximately a right angle to said valve stem.

13. The fuel pressure regulator of claim 12, wherein the valve stem includes a shoulder portion at one end thereof and said elastomeric valve disk is secured to the valve stem abutting said shoulder portion so that a valve mounting location is provided for securing the elastomeric valve disk to the valve stem at a predetermined point longitudinally along the valve stem.

14. The fuel pressure regulator of claim 12, wherein said valve stem is secured to the resilient impervious diaphragm at the other of its end remote from said elastomeric valve disk so that said elastomeric valve disk is directly coupled to the resilient impervious diaphragm.

15. The fuel pressure regulator of claim 10, wherein said valve stem is mounted to said resilient impervious diaphragm, and further comprising second biasing means within said low pressure diaphragm chamber for urging said resilient impervious diaphragm away from said low pressure diaphragm chamber, said second biasing means adapted to counter-balance the biasing force of said first biasing means, wherein the low pressure diaphragm chamber includes a counter-bore and said second biasing means is disposed within said counter-bore, and wherein the flow of fuel through the fuel pressure regulator is along a main path along which a majority of the flows and the counter-bore is displaced from the main path.

* * * * *